(12) United States Patent
Lu et al.

(10) Patent No.: US 7,123,750 B2
(45) Date of Patent: Oct. 17, 2006

(54) AUTOMATED PLANT ANALYSIS METHOD, APPARATUS, AND SYSTEM USING IMAGING TECHNOLOGIES

(75) Inventors: Hugh Lu, Johnston, IA (US); Edwin J. Anderson, Johnston, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 1034 days.

(21) Appl. No.: 10/060,817

(22) Filed: Jan. 29, 2002

(65) Prior Publication Data

US 2003/0142852 A1  Jul. 31, 2003

(51) Int. Cl.
*G06K 9/00* (2006.01)

(52) U.S. Cl. .......................... 382/110; 356/402; 348/89

(58) Field of Classification Search ................ 382/110; 356/402; 348/89
See application file for complete search history.

(56) References Cited

U.S. PATENT DOCUMENTS

| | | | | |
|---|---|---|---|---|
| 4,436,207 A | * | 3/1984 | Klukis | ........................ 209/577 |
| 5,253,302 A | * | 10/1993 | Massen | ........................ 382/110 |
| 5,412,219 A | * | 5/1995 | Chappelle et al. | ........ 250/461.1 |
| 5,841,883 A | * | 11/1998 | Kono et al. | ................. 382/110 |
| 5,898,792 A | * | 4/1999 | Oste et al. | ................... 382/110 |
| 6,014,451 A | * | 1/2000 | Berry et al. | ................. 382/110 |
| 6,236,739 B1 | * | 5/2001 | Conrad | ........................ 382/110 |
| 6,366,681 B1 | * | 4/2002 | Hutchins | .................... 382/110 |
| 6,466,321 B1 | * | 10/2002 | Satake et al. | ............... 356/402 |
| 6,567,537 B1 | * | 5/2003 | Anderson | .................... 382/110 |
| 6,683,970 B1 | * | 1/2004 | Satake et al. | ............... 382/110 |

\* cited by examiner

*Primary Examiner*—Bhavesh M. Mehta
*Assistant Examiner*—Aaron Carter
(74) *Attorney, Agent, or Firm*—McKee, Voorhees & Sease, P.L.C.

(57) ABSTRACT

The present invention relates to an apparatus, method, software algorithm and system for evaluating plants for conditions or characteristics. In one aspect, the method can include imaging at least a portion of the plant and evaluating the image for discriminating condition(s) or characteristic(s) of interest. In one example, soybean roots are imaged and the image is evaluated to discriminate between soybean cyst nematode (SCN) cysts and the plant roots to count the number of SCN cysts for the plant. In another embodiment, a plant is illuminated by a ultra-violet radiation selected to cause photo-induced fluorescence of a target, e.g. SCN cysts. The fluorescence emitted is collected and analyzed to discriminate between the target and the remainder of the plant.

78 Claims, 9 Drawing Sheets

AUTOMATED PLANT ANALYSIS METHOD, APPARATUS, AND SYSTEM USING IMAGING TECHNOLOGIES

I. BACKGROUND OF THE INVENTION

A. Field of the Invention

The present invention relates to evaluation or analysis of plants for pests, infestations, abnormalities, and other conditions or characteristics. One specific example would be identification and/or quantification of soybean cyst nematode infestation.

B. Problems in the Art

Soybean cyst nematode (SCN) is one of the most significant problems for soybean producers. SCN infestations can cause 20 to 40% reduction in yield. This literally translates into billions of dollars a year in lost production.

The problem is difficult because it is many times simply too expensive to treat. For example, effective fumigation of large crop areas could cost more than the loss of value from reduced production caused by SCN. One attempt to avoid or diminish the potential or actual infestation is to rotate crops from year to year. However, crop rotation is not always successful and it is many times not desirable to the farmer.

Some soybean plants appear more resistant than other varieties to SCN. Therefore, substantial resources have been directed to breeding soybean varieties with SCN resistance to address the SCN problem.

In such plant breeding programs, breeders must carefully document heritage of soybean plants, grow them, and then evaluate their resistance to SCN. Plants exhibiting desirable SCN resistance are then bred with other varieties and their progeny are evaluated for SCN resistance. Currently, this is done by pulling selected plants from breeding plots or containers maintained in environmentally controlled chambers (for example after four weeks of growth), shaking off dirt, sand or other debris from the roots, placing them on an examination surface, and manually counting SCN cysts on the root system of that plant. This count is then converted to an SCN score or rating which is given to that bred variety of soybean, and which identifies its resistance to SCN to evaluate possible use of the plant for further breeding purposes or commercialization.

As can be appreciated, this manual SCN counting process is extremely slow, cumbersome and resource intensive. Substantial numbers of plants must be counted. The time and labor costs are substantial.

Accuracy is also an issue. Human error can be a problem. Inattention or fatigue over long periods of SCN counting are inevitable.

Further, accurate counting is difficult because of the small size of SCN. Cysts are the dead female bodies of the pest and are on the order of less than one millimeter in diameter. Moreover, particularly to the human eye, there is usually not a high distinction in color contrast between SCN and root material, nitrogen fixing nodules that form in soybean roots, or sand or other small particles. It simply may not be possible to expect highly accurate counts by the human eye.

Thus, there is a real need in the art for improvement with respect to identifying and/or quantifying SCN on soybeans, and in particular, a real need to make such identification and/or quantification more efficient and economical.

It would also be advantageous to efficiently and economically identify and/or quantify other pests, infestations, conditions, or characteristics with respect to soybean plants. Still further, it would be advantageous to efficiently and economically identify and/or quantify similar or analogous things or problems with other types of plants. Many other examples exist, including, but not limited to: *Heterodera glycines* (soybean cyst nematode) on common bean, vetch, lespedeza, lupine and a few other 'weedy' legumes; *Heterodera trifolii* on clover; *Heterodera avenae* on cereals (like oats); *Heterodera schachtii* on sugar beets, crucifers and spinach; and *Globodera rostochiensis* on tomato and eggplant. It would also be advantageous to identify and quantitate other pathogen infections, including but not limited to corn ear mold on corn, as a further example.

C. Objects, Features or Advantages of the Invention

It is therefore a principle object, feature, or advantage of the present invention to present an apparatus, method, and system that improves upon the state of the art.

Additional objects, features or advantages of the present invention relate to methods, apparatus, and systems useful in the identification and quantification of conditions or characteristics of plants which:

a. is relatively quick;

b. is economical;

c. provides at least approximately the same order of accuracy as the state of the art;

d. is less labor intensive;

e. promotes better identification and discrimination of desired targeted locations or characteristics of a plant; and/or f. is amenable to automation, in whole or in part.

These and others objects, features, or advantages of the present invention will become more apparent with reference to the accompanying specification and claims.

II. SUMMARY OF THE INVENTION

The present invention comprises apparatus, methods, and systems for assisting in identification and/or quantification of certain conditions or characteristics of plants. A method according to the invention comprises creating or enhancing a detectable contrast between a targeted manifestation of a condition or characteristic, and discriminating between the manifestation and other parts of the plant. In one aspect of the invention, the method comprises imaging at least a portion of a plant, and discriminating between aspects of that portion of the plant based on analysis of the image. Optionally, the discriminated aspects can be quantified based on the analysis.

An apparatus according to the present invention comprises an imaging device and a processor in communication with the imaging device, the processor adapted to evaluate and discriminate, and optionally quantify, between aspects of the plant, for example, a condition or characteristic of a portion of the plant.

In one embodiment of the invention, a discrimination task is enhanced by illuminating a portion of the plant with a light beam or other energy. The illumination can optionally be selected to provide enhanced contrast between the targeted aspect or subject matter to be discriminated and the remainder of the plant. One method of enhanced contrast is use of photo-induced fluorescence techniques. Another is heat differences between target and remainder of the plant.

In a further aspect of the invention, identification and/or quantification of the target(s) can be used to make decisions in a plant breeding program, as in measuring the results of a bioassay.

III. BRIEF DESCRIPTION OF THE DRAWINGS

IV. DETAILED DESCRIPTION OF PREFERRED EMBODIMENTS

A. Overview

Figure 1:
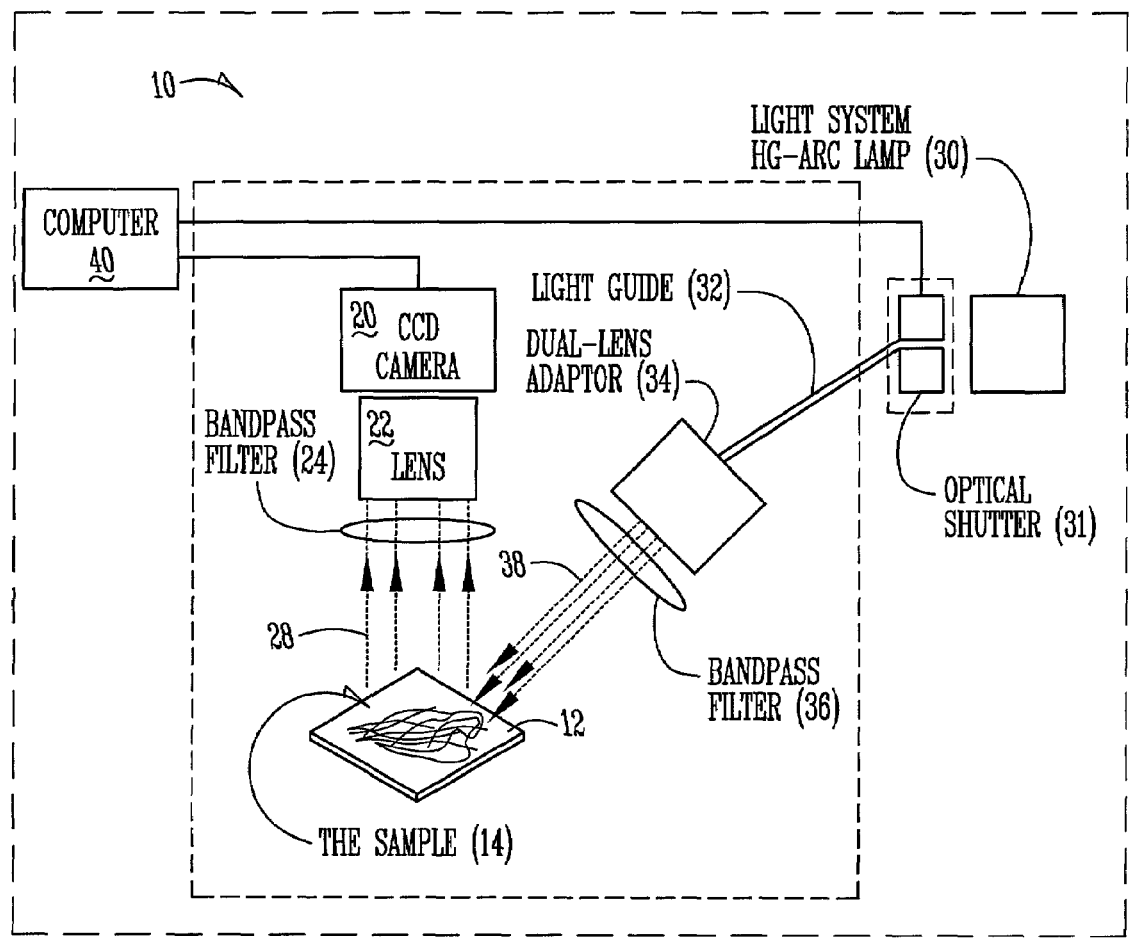
FIG. 1 is a schematic diagram of an apparatus and system according to the present invention.

For a better understanding of the invention, specific embodiments according to the general invention will now be described in detail. These exemplary embodiments will be described in association with the Figures enumerated previously. Reference numbers and/or letters will be used to indicate certain parts or locations in the drawings. The same reference numerals and/or letters will be used to indicate the same parts and locations throughout the drawings unless otherwise indicated.

B. Environment of Description of Embodiments

The following detailed descriptions will be made with respect to identifying and/or quantifying soybean cyst nematode (SCN) cysts on soybean plants. Therefore, the condition or characteristic of the plants that is targeted for discrimination in this example is SCN on soybean plants. The cysts are the targets for discrimination from other parts of the soybean plant, in particular the soybean roots.

It is to be understood, however, that this setting or environment, namely SCN cysts and soybean plants, is but one form the invention can take and it is not intended to limit the invention. The invention can be applied to other targets or discrimination tasks for soybean plants or other plants.

C. General Apparatus and Method

FIG. 1 shows schematically a configuration for a first embodiment of the present invention. What will generally be called system 10 includes a sample location 12 (e.g. a sample tray) upon which can be placed a sample 14 (e.g. soybean plant roots). An imaging device, here a charge-coupled device (CCD) camera 20, is positioned in relatively close proximity to sample 14. The higher the spatial resolution (e.g. number of pixels), the better, however cost is a consideration and better spatial resolution usually means increased cost for the imagining device. A lens 22 and bandpass filter 24 (e.g. a 650AF100 filter) are placed in alignment with the aiming axis of camera 20 relative to sample 14.

In this embodiment, a light source 30 (e.g., Hg-arc lamp, 100 watt) directs a light beam via optical shutter 31 (e.g. opens of a short period of time—the function of shutter 31 is to reduce exposure time of filter 36 from ultra-violet radiation) and light guide 32 (e.g. fiber optic) through a dual-lens adapter 34 and bandpass filter 36 (e.g. a 330WB80 filter), onto the sample. It has been found that somewhere around 100 W light sources, such as Hg arc or xenon, are adequate. Too much intensity can result in photo bleaching, which is undesirable. As indicated in FIG. 1, light beam from light source 30 (indicated by arrows 38) is preferably evenly and uniformly applied across sample 14. Light from sample 14 (indicated generally by arrows 28 in FIG. 1) is filtrated by a bandpass filter 24 and then collected by camera 20. An image is formed in camera 20 and a digital image is generated. Camera 20 collects all light energy within its field of view, but the light energy is filtered, which gets rid of such things as reflections and concentrates on a band of emitted fluorescence from the sample.

Camera 20 and optical shutter 31 are controlled by computer 40 (e.g., PC). The operations of camera 20 and shutter 31 are synchronized with light source 30, always on during operation. Computer 40 includes software (the algorithm is described in FIG. 6) that can access and analyze the image captured by camera 20.

Alternatively, the captured image can be manually analyzed by using commercial software such as MetaMorph from Universal Imaging Corporation of Downingtown, Pa. and Optimas from Media Cybernetics of Silver Spring, Md.

As noted in FIG. 1, with regard to soybean plants and SCN cysts, light source 30 (e.g. a mercury arc, xenon, or similar lamp), is filtered to pass only the ultraviolet range of approximately 290–370 nm as excitation light onto sample 14. The fluorescence emitted by such excitation is monitored by camera 20 in the wavelength region of approximately 600–700 nm. The image created in camera 20 therefore is only of that range of wavelengths collected through filter 24 and lens 22.

It is to be understood, however, that collection at or including other wavelength regions (preferably nearby) with other bandpass filters may also satisfactorily discriminate the SCN cysts from the background. Preferably, for SCN cysts, an approximate range of 270 nm to 390 nm has been found to work adequately for excitation light, and an approximate range of 580 nm to 720 nm for collection.

Figure 2:
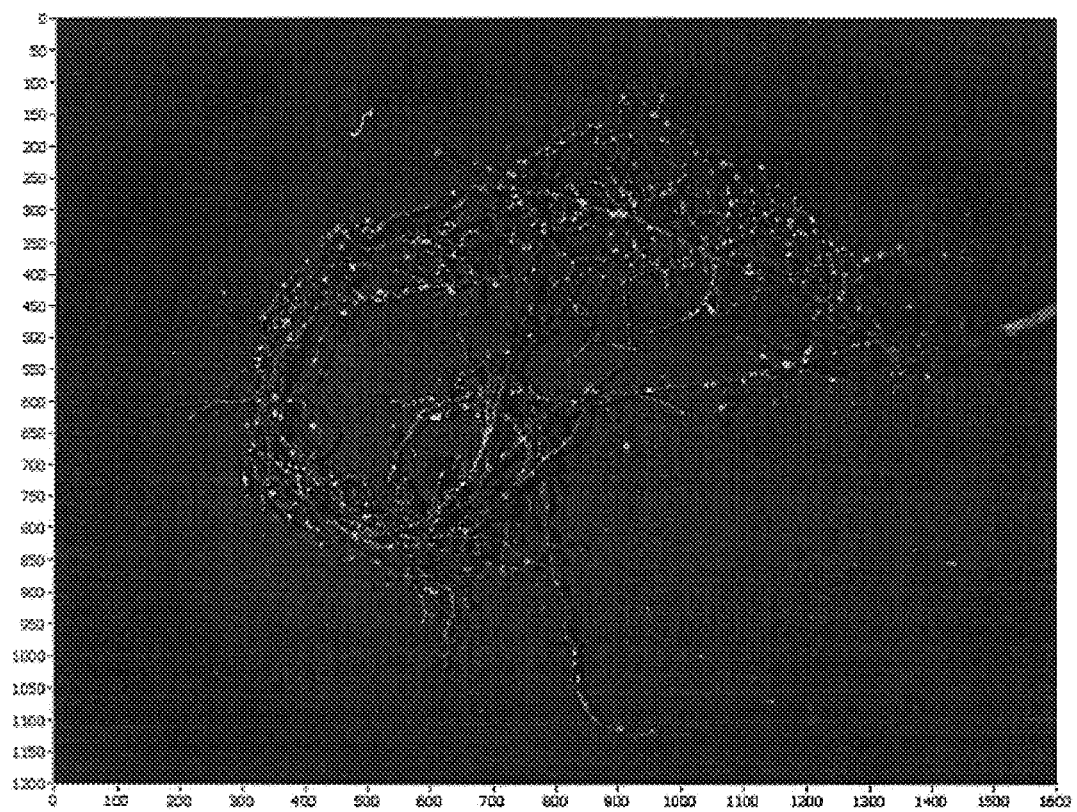
FIG. 2 is a digital image of a soybean plant root with SCN, imaged under excitation by 290–370 nm ultra-violet radiation with 600–700 nm spectral filtration at the imager.

The inventors have discovered that SCN cysts tend to fluoresce under approximately 290–370 nm excitation wavelength in such a manner that they are usually satisfactorily and readily distinguishable from the soybean roots, other common features on soybean roots, or normal background, especially when collected at a higher wavelength, e.g. approximately 600–700 nm (see, e.g., FIG. 2—the image was taken using a RT-SPOT camera—white dots tend to be cysts).

Figure 5:
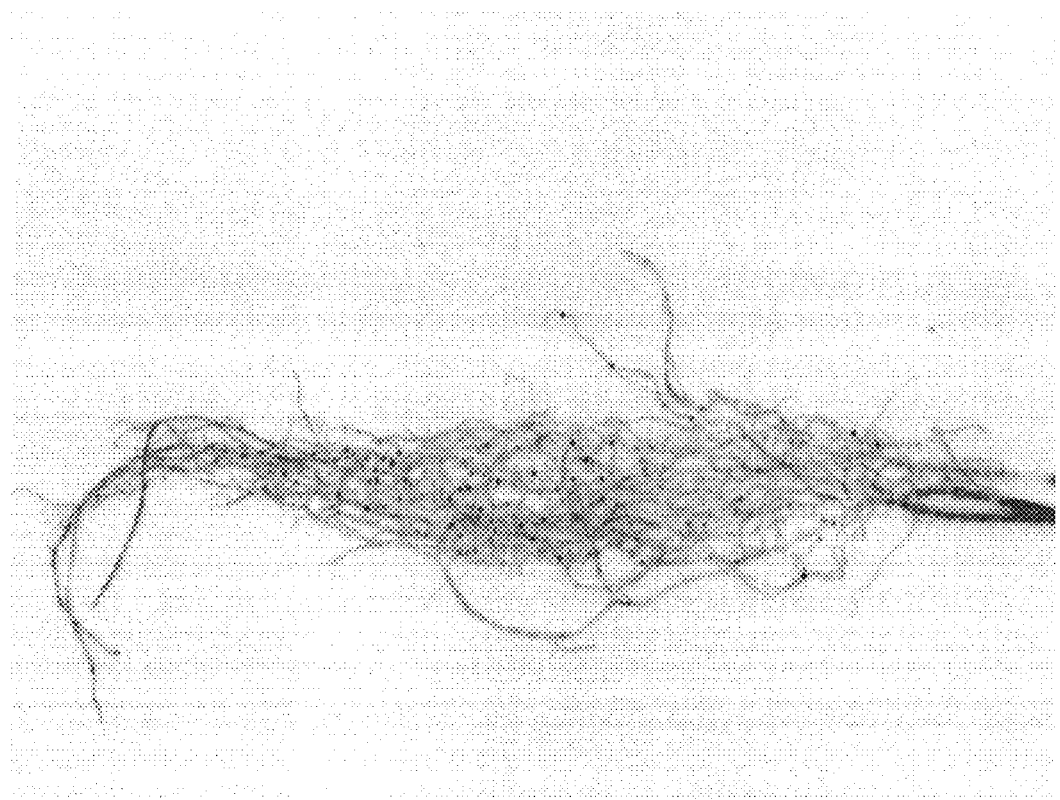
FIG. 5 is an inverted image of soybean root infested with SCN cysts using a Kodak imaging station under the excitation of 300–400 nm and the image collected without spectral filtration.

It is also to be understood, however, that SCN cysts might be satisfactorily discriminatable by ultra-violet radiation illumination without using any collection filtration. FIG. 5 shows this possibility. A Kodak imaging station (model number 440CF and available from NEN Life Science Products Inc. of Boston, Mass.) was used to create the image of FIG. 5 under 300–400 nm excitation but without spectral filtration at camera 20. FIG. 5 is an inverted (negative) image. In the original image, the higher intensity dots are whiter and the lower intensity areas of the image are darker. In the inverted image of FIG. 5, the higher intensity areas (cysts) are darker and the lower intensity areas (i.e. roots and background) here are inverted in gray scale to lighter. It can be seen that darker dots across the soybean root system in FIG. 5 are distinguishable. It is possible to automatically compute the number of the cysts with advanced image processing algorithms. But also, manual counting (e.g. with the human eye), based on the contrast in the image, is possible.

Figure 3:
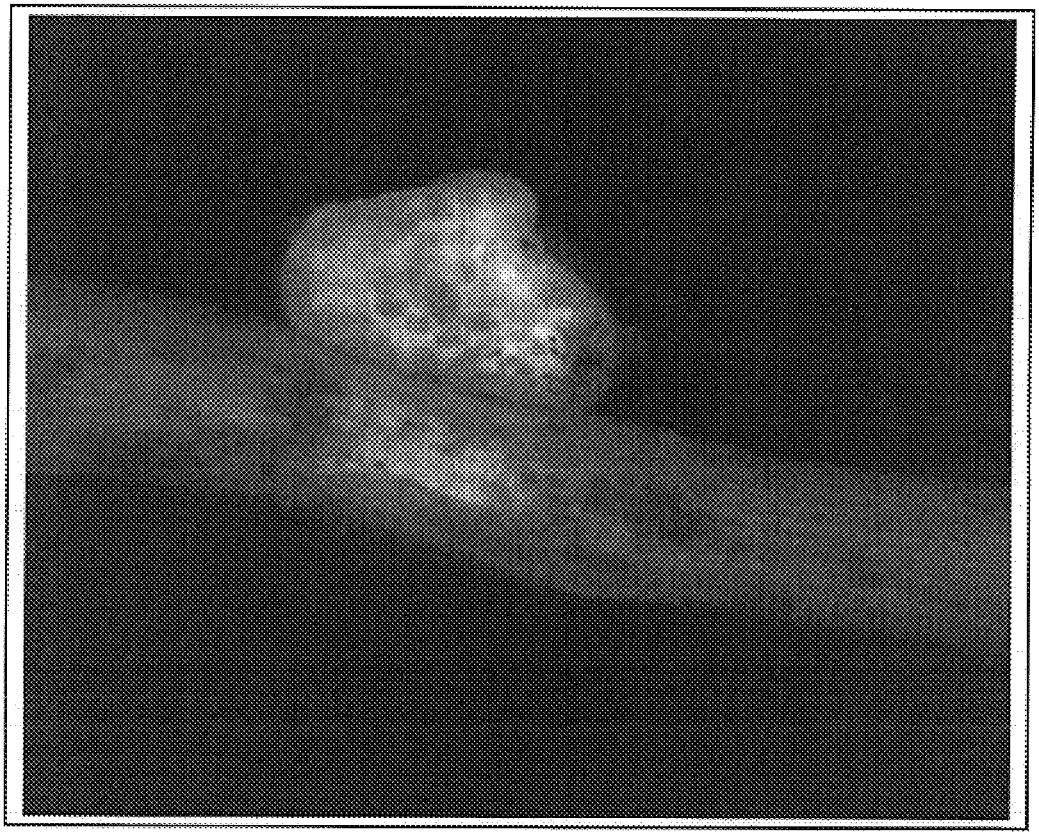
FIG. 3 is a highly magnified digital image of one SCN cyst on a soybean root under specific excitation wavelength (533–588 nm) and collection wavelength (515–555 nm).
Figure 4:
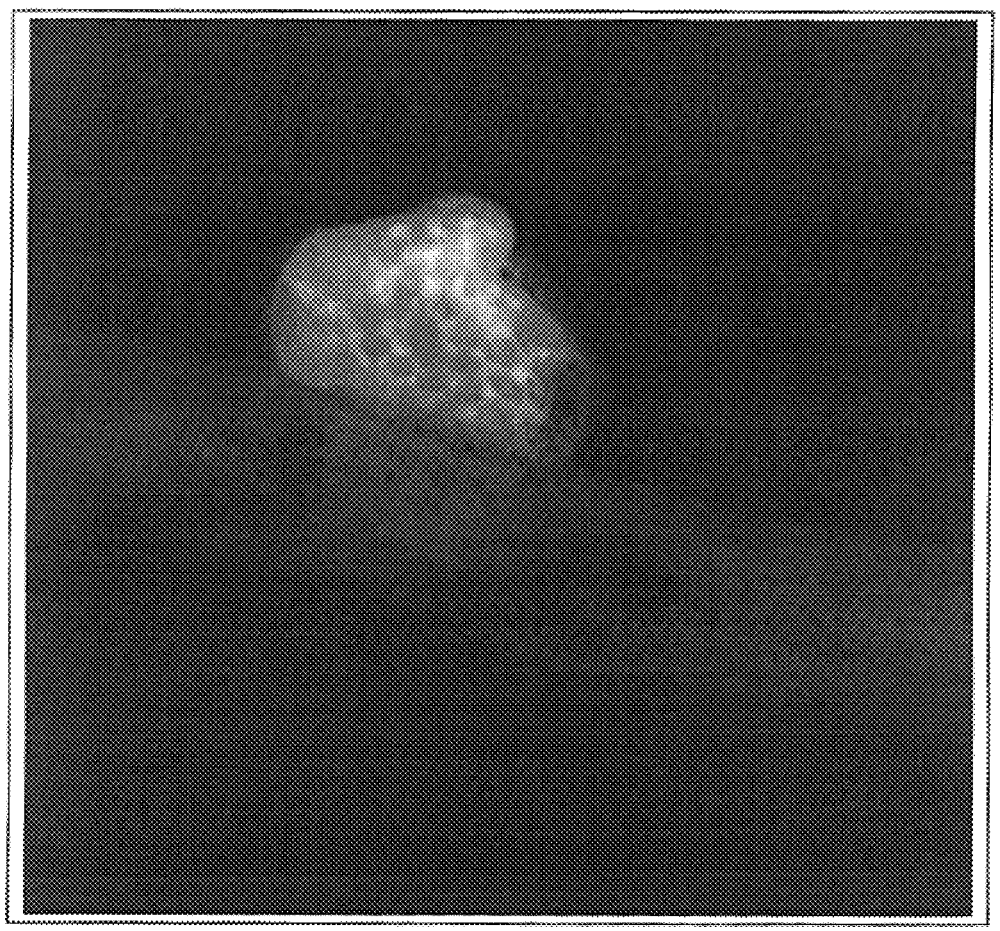
FIG. 4 is the same SCN cyst image shown in FIG. 3 under different excitation and collection wavelengths (465–495 nm and 608–683 nm respectively). A much higher contrast is obtained in FIG. 4 than in FIG. 3.

FIGS. 3 and 4 illustrate the optimization of contrast between SCN cysts and background through optimization of selection of excitation and collection wavelengths. FIG. 3 shows the enlarged image of one cyst on a single root. Excitation was at 533–588 nm from a mercury arc light source 30. Bandpass filter 24 at the imager was 515–555 nm. Compare the image shown in FIG. 3 with that of FIG. 4. The image of FIG. 4 is of the same sample where excitation bandpass filter 36 was 465–495 nm, the light source 30 was a mercury arc light, and bandpass filter 24 was 608–683 nm. FIG. 4 has a much higher contrast between SCN cyst and root or background.

Figure 6:
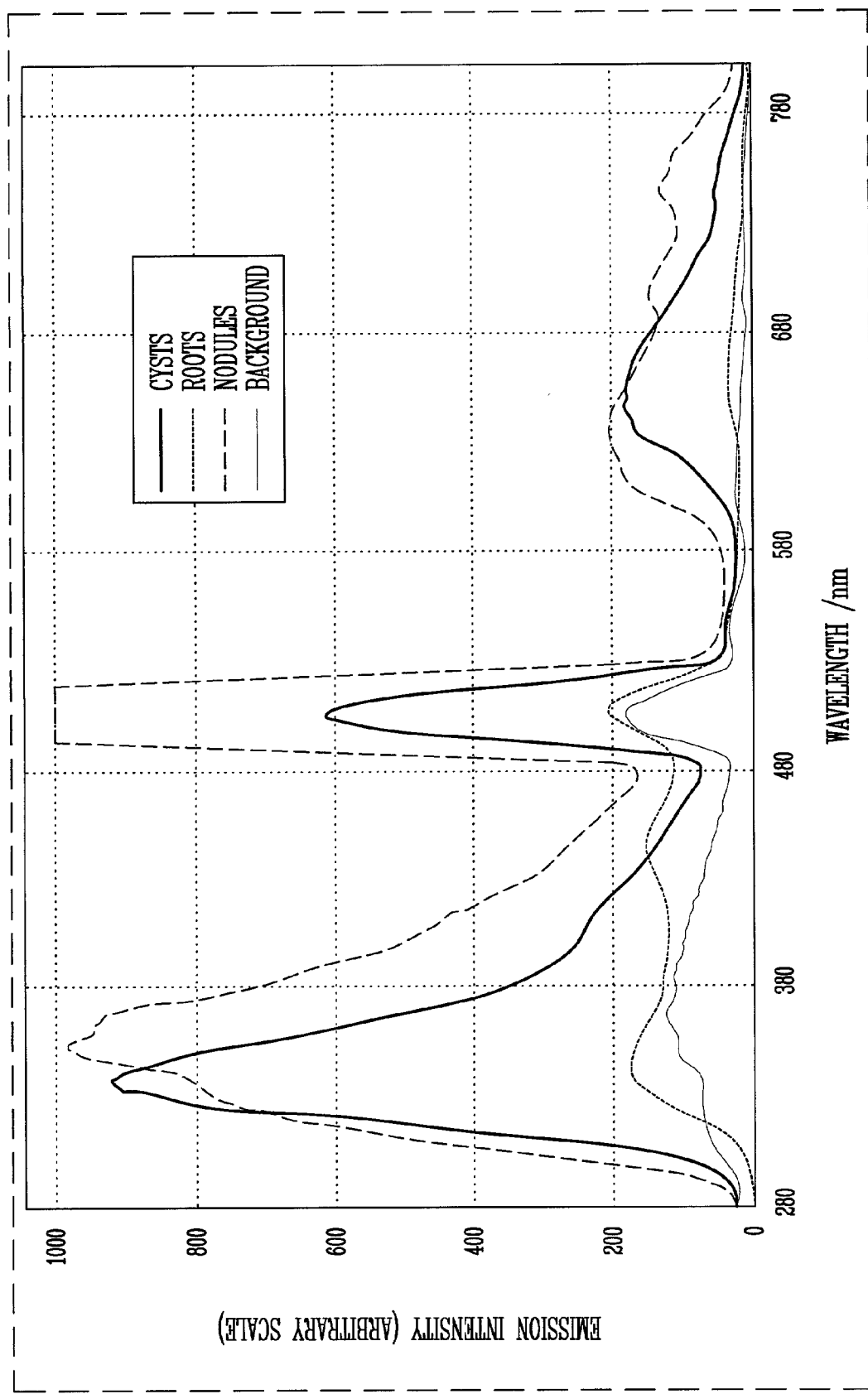
FIG. 6 is a graph illustrating the emission spectral profile of SCN cyst and other constituents of a soybean root and background under 290 nm ultra-violet radiation.

FIG. 6 is a graph illustrating emission spectra of SCN cysts relative to other constituents of typical samples 14 under a 290 nm excitation radiation (e.g. roots, nitrogen nodules, background). It can be seen that there are three potential collection wavelength regions to select from for fluoresce imaging of the SCN infested soybean root. The first wavelength region, peaked at 340 nm, might be used but was not selected. Collecting an image at this wavelength region can introduce intensive interference with excitation light because of its close position in wavelength to the excitation light. Furthermore, cameras (possible exceptions are very expensive cameras) do not have good response to the light at this wavelength region. Both the second (approx. 450–500 nm) and third (approx. 580–780 nm) regions are better candidates to be used as collection wavelength regions to generate high-contrast images. Experiments demonstrated that collecting images at either from approximately 480–530 nm or approximately 600–700 nm provided very high contrast images between the cysts and other components (e.g. soybean roots and nitrogen nodules) or background. But, for the camera tested (SPOT-RT digital CCD camera), the images collected at 600–700 nm had higher contrast than those of collected at 480–530 nm. Images were collected by using a 600–700 nm bandpass filter if no imaging condition is specified.

To achieve the best possible image contrast for other kinds of samples and applications, excitation and collection wavelengths can be optimized by systematic spectral scanning of all components of the sample. All possible excitation wavelengths of the target may be initially identified. Emission spectra of all components under all these excitation wavelengths may then be scanned. Optimal excitation wavelength can then be selected from the evaluation of all emission spectra to provide optimal contrast between the target and other components.

Thus, as shown in FIG. 1, system 10 is basically an imaging system using photo-induced fluorescence technology to create a digital image that optimizes the ability to discriminate the target, here SCN cysts, from the soybean roots or any other components in the image, including background. Camera 20 can be a SPOT-RT digital CCD camera from Diagnostic Inc. of Sterling Heights, Mich. Light system 30, 32, and 34 is available from EFOS of Mississauga, Ontario of Canada. Bandpass filters 36 and 24 were made by Omega Optical of Brattleboro, Vt.

It is suggested that a high spatial resolution camera be used for capturing the number of targets on the root system. The higher the spatial resolution of the camera, the better the computer algorithm appears to work. However, high spatial resolution will slow down the imaging process. It is believed that a minimum of 4×4 number of pixels is desirable to cover a single target on the image.

Software processes the image from camera 20 and computes the number of the cysts. The software evaluates the intensity of the digital image on a bit-by-bit or pixel-by-pixel basis. It can be programmed to discriminate between not only intensity but also other discernible manifestations in the image.

Figure 7:
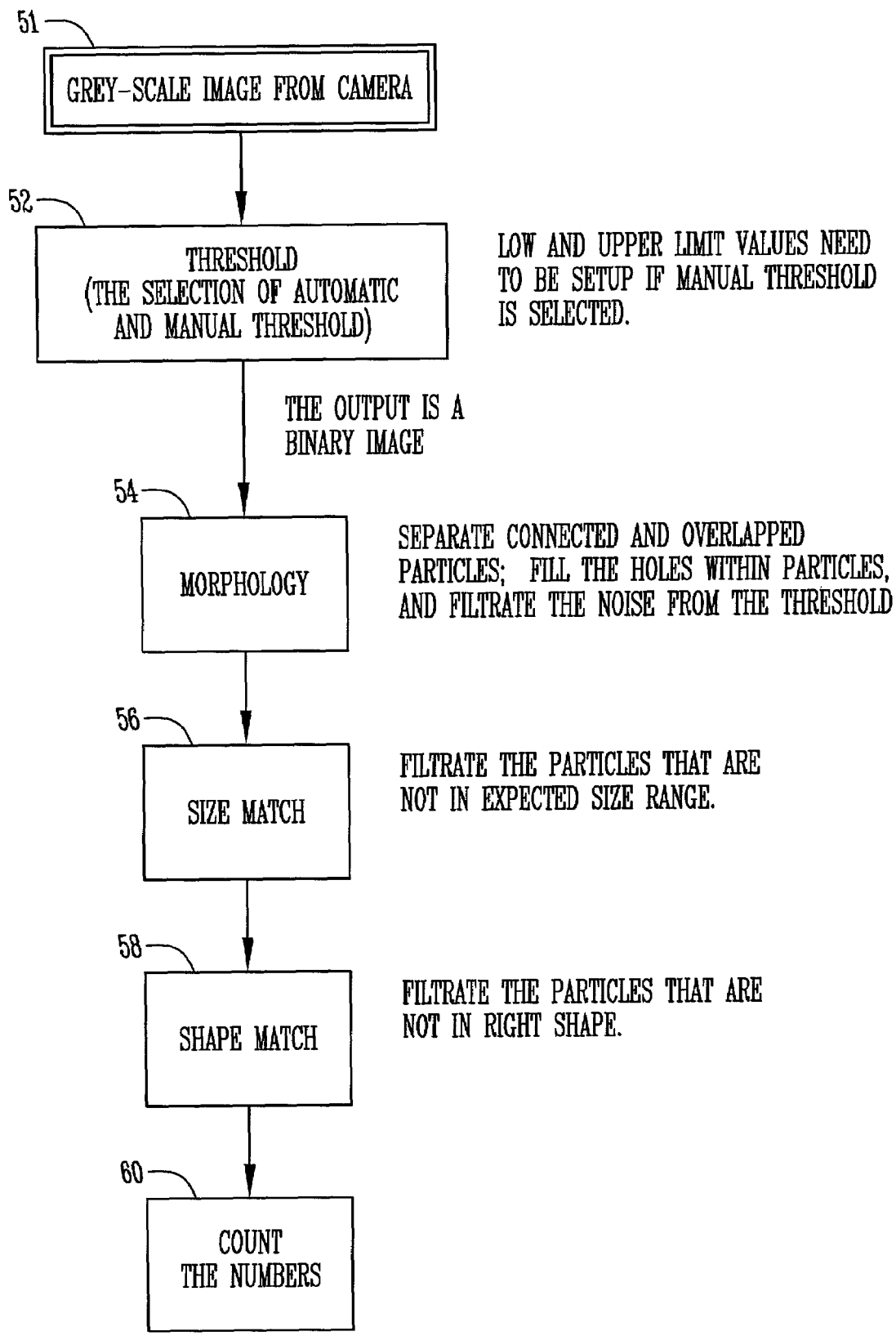
FIG. 7 is a flow chart of one embodiment of a programmable automatic counting regimen according to the present invention.

For example, FIG. 7 illustrates the principles of the software algorithm for this embodiment of the invention. There are five primary steps in the computing algorithm to calculate the numbers of target particles (here the cysts).

1. Thresholding:

A gray-scale (values 0–255 correlated to pixel intensity for an 8-bit image) image (FIG. 7, step 51) is sent from camera 20 to computer 40. Software in computer 40 is programmed to process the image into a binary image using either manual thresholding or automatic thresholding (see step 52 in FIG. 7). All pixels with gray-scale values higher than the threshold value are treated as target, or class one. All pixels with gray-scale values lower than the threshold value are treated as background, or class zero. Thus, a binary image, where all bright spots represent potential targets, is obtained after thresholding.

This thresholding function processes the original gray-scale image into a binary image with all target particles as bright spots (the class "one") and all other constitutes as dark background (the class "zero"). Three thresholding methods were used to determine the threshold value. The first one is "manual thresholding", where threshold value can be manually selected. A histogram of the image may provide an initial estimate of the value.

Two statistic models were used to compute two other threshold values: "Entropy" and "Clustering". Those models are explained at (1) IMAQ Vision Concept Manual, October, 2000. National Instruments.

Entropy is a measure of the randomness in a system. A system with higher entropy is more stable than the one with lower entropy value. The same concept may be established for an image. The probability of occurrence $P_i$ of the gray level i is defined as $$p_i = \frac{h_i}{\sum_{i=0}^{N-1} h_i} \quad (1)$$

Here $h_i$ is the number of pixels in the image at gray level i, and N is the total number of gray levels in the image (N=256 for a 8-bit image). The entropy of a histogram of an image with gray levels in the range [0, N−1] is $$H = -\sum_{i=0}^{N-1} p_i \log p_i \quad (2)$$

If k is the value of the threshold, then the two entropies $$H_d = -\sum_{i=0}^{k} p_i \log p_i \quad (3)$$

$$H_b = -\sum_{i=k+1}^{N-1} p_i \log p_i \quad (4)$$

represent the measures of the entropies associated with the dark and bright pixels in the images after thresholding.

The optimum threshold value k is gray-level value that can maximize the total entropy in the threshold image given by $$H_t = H_d + H_b \quad (5)$$

Mathematically, this can be achieved by setting the first derivative of the entropy $H_t$ against threshold value k $$\frac{\partial H_t}{\partial k} = 0 \quad (6)$$

Threshold value can then be calculated by solving equations (1) to (6). There is no explicit solution for equations (1) to (6). The equations can be solved numerically.

Instead of dividing gray levels into two classes as in "Entropy" model, the "Clustering" model sorts the histogram of the image into multi classes, and then October, 2000, cited above).

Other thresholding methods are possible.

2. Morphology.

But also, the software can be programmed to use morphology transformation on the binary image (step 54). The software can take certain actions or perform certain operations based on selected morphology recognition. Examples are indicated by the flow chart in FIG. 7, to the right of step 54. All particles on the binary image can either be structurally modified or altered for quantitative analysis. Afterward, the binary image has the particles in different sizes and shapes.

Morphological transformations extract and alter the structure of particles in an image and prepare particles for quantitative analysis. Morphological transformations can be used for expanding or reducing particles, filling holes, closing inclusions, smoothing borders, removing dendrites, and more. Many morphological transformations are possible. "Erode" and "Auto M" were selected for use in this embodiment.

Different morphological transformations can produce significant differences on the particle-analysis results for some samples. For most samples, "Erode" transformation tends to generate a smaller number and "Auto M" transformation tends to generate a higher number then if no morphological transformation is performed. Such processing and manipulation is well known.

3. Size Match.

Step 56 illustrates how the image is subjected to "size matching". Areas of the image (e.g. clusters or subsets of pixels) outside of a user-adjustable size range are excluded from the count. Areas of the image otherwise indicative of a SCN cyst will be ignored if not within the size range (in this example 10 to 60 pixels).

This is a very straightforward operation. The operation filters out both small and large particles from the image and allows only the particles falling in cyst-size criteria to be counted later. Small particles can be noises from the original image or from imaging processing techniques that were performed earlier. Large particles were frequently found to be bright spots from root fluorescence. Root fluorescence has been found to be a major noise for the method. It has been found that some soybean varieties fluoresce. The fluorescence is very close to the cyst fluorescence in wavelength and difficult to be filtered out optically. "Size match" function will filter out root fluorescence to some degree, but not totally because of non-uniformity of the root fluorescence.

There are many ways to perform the size matching. Surface area of a particle in number of pixels has been used as a convenient measure. It is found that the criteria of 10–60 pixels worked very well for most samples in our experiments. However, it has to be emphasized that the criteria should vary with many factors such as camera, lens, camera working distance, lighting condition and etc. Also, the counting results seem to be sensitive to size match, especially, to the lower value of the criteria. A camera with high spatial resolution is very helpful in the "size match" function.

4. Shape Match.

Step 58 illustrates how areas of the image having a shape the programming considers not indicative of an SCN cyst are excluded or ignored by the software. Particles that do not meet shape criteria are excluded from the image. Different shape characterizations are selectable. For example, here shapes that do not fit within the definition of Heywood circularity, with a lower value 1.00 and upper value 1.30, are ignored.

Only certain particles meeting "shape match" criteria will be qualified in particle counting. "Heywood Circularity Factor" has been used in the experiments. Heywood circularity factor is the ratio of a particle perimeter to the perimeter of the circle with the same area. The closer the shape of a particle is to a perfect circle, the closer the Heywood circularity factor to 1. 1.0–1.3 were used as the criteria for the cyst shape in Heywood circularity factor. Many other factors may be used as the criteria also. The counting results are less sensitive to "Shape Match" than "Size Match". A camera with high spatial resolution is also very helpful in "Shape Match" as it is in "Size Match".

5. Count.

After the image has been analyzed according to the above-discussed operations or screenings, the software counts the number of spots on the binary image that fit within the criteria of the succeeding steps (see step 60). This count is then assumed to reflect the number of SCN cysts for the soybean root that was imaged.

All particles that meet the selected criteria are counted as the targets or the cysts. The software computes the number of cysts from a root image.

D. Operation

By referring to the foregoing description, FIGS. 1–7, and also the screen shots of FIGS. 8 and 9, operation of this embodiment of the invention will now be described in additional detail.

An approximately four week old soybean plant, being grown in a soybean breeding experiment, is pulled from its growing bed. Soil, sand and other debris are removed to the extent reasonably possible by gently shaking the roots. It is important not to scrape or damage the roots or the SCN cysts.

The sample is then positioned on a flat non-fluorescent and non-reflective sample tray 12. The plant 14 is usually arranged to approximately one inch by five inch perimeter dimensions and a depth of ⅛ inch. Preferably, as many of the roots as possible are individually exposed in the field of view of the imager 20, avoiding any overlapping.

An excitation light beam from a mercury arc lamp 30 is directed as uniformly and evenly as possible across the sample 14 in the range of 290–370 nm. It is believed that intensity of fluorescence emission based on the excitation light depends on the age of the cyst and its freshness (moisture content). It has been discovered empirically that fluorescence intensity decreases as the sample dries, and a low-contrast image is obtained as a result. Excessive moisture of the sample also produces a low-contrast image, due to the reflection from the sample introduced by excess moisture and, possibly, reduced fluorescence intensity of the cysts. It is advisable to conduct imaging at about the same sample freshness and moisture. Watering the plants a couple of days before harvest and conducting imaging experiments not more than a couple of hours after harvest are recommended practices.

As illustrated at FIG. 6, it has been found that the collection of the images from sample 14 at a higher wavelength (600–700 nm), while excitation of sample 14 with a ultra-violet light at a lower wavelength (290–370 nm), resulted in enhanced contrast between the cysts versus the plant root and the background. As can be seen in FIG. 4, the background, at least to the human eye, is almost invisible.

Figure 8:
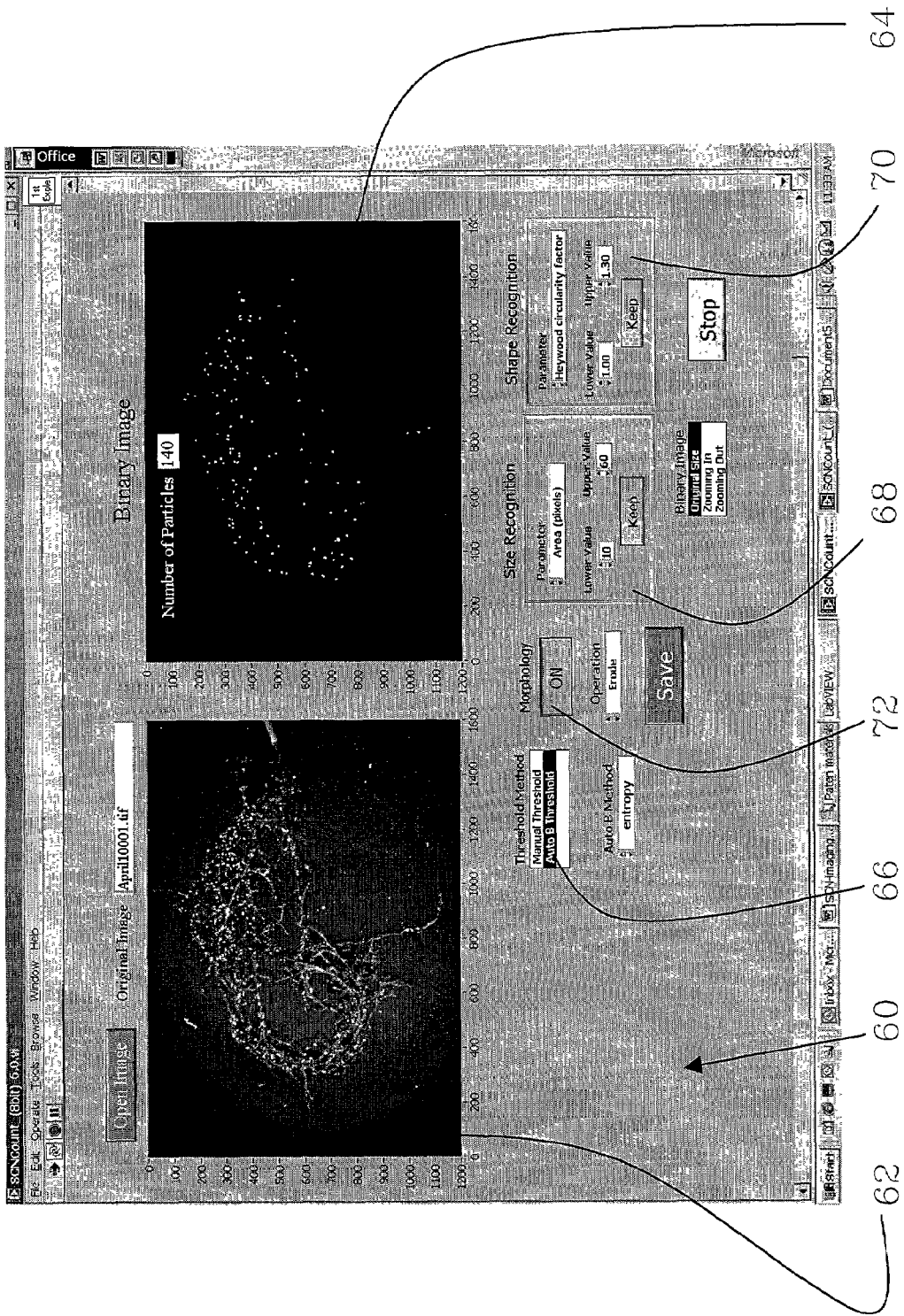
FIG. 8 is a screen shot of a graphic user interface (GUI) of a computer program with 'Automatic Thresholding' that can be used with the present invention, illustrating, on the left, an image of a soybean root under ultra-violet excitation and optical filtration of the emission, and, on the right, an image after software processing, indicating SCN cyst locations.

FIG. 8 illustrates a graphic user interface (GUI) for computer 40 for a soybean sample. Screen shot 60 of FIG. 10 has a left hand image 62, which is a gray scale image of step 50 of FIG. 7. Although the cysts are somewhat identifiable relative to the soybean roots, software has been pre-programmed to process the image to screen out things not indicated to be SCN cysts. As a result, the software processes the image essentially into the form shown in the right hand image of FIG. 8 (see reference numeral 64).

The software then "counts" each of the white dots (each of which having met the preprogrammed criteria for a cluster or subset of pixels of the digital image). In this example the software recognized 140 image areas meeting the programmed criteria of the software, indicative of SCN cysts, and thus reports the existence of 140 SCN cysts.

In FIG. 8, the option of 'Automatic Threshold' is selected. As described earlier, the computing algorithm automatically finds a threshold value and converts the image into a binary format. The criteria settings for size and shape recognitions are shown in FIG. 8 and can be adjusted by the user. Reference numeral 68 shows that the size range was selectable based on pixels (here between 10 and 60 pixels).

Reference numeral 70 shows that the shape criteria is selected as "Heywood Circularity Factor" and its associated values were selected to be 1.00 to 1.30. "Heywood Circularity Factor" is a measure of an object's deviation from circular shape. "Heywood Circularity Factor" is 1.00 for a perfect circle.

Thus, to be counted as one cyst, the computer must "see" a contiguous set of pixels between two designated numbers (10–60), having a "Heywood Circularity Factor" between 1.00 and 1.30, and all pixels must have an intensity value higher than the threshold value that is automatically computed by the algorithm.

Thus, a single bit falling within the designated intensity range, would not be counted because it is underneath the size in the size range. Similarly, an appropriately sized and appropriate intensity collection of bits would not be counted if the shape did not fit the shape recognition criteria of the program.

As can be appreciated, the selection of these programmable factors is based on a priori knowledge and empirical experimentation relative to usual size, shape, and fluorescent intensity of SCN cysts. The size, shape, and intensity recognition and discrimination tasks are well-known vision technology tasks.

Figure 9:
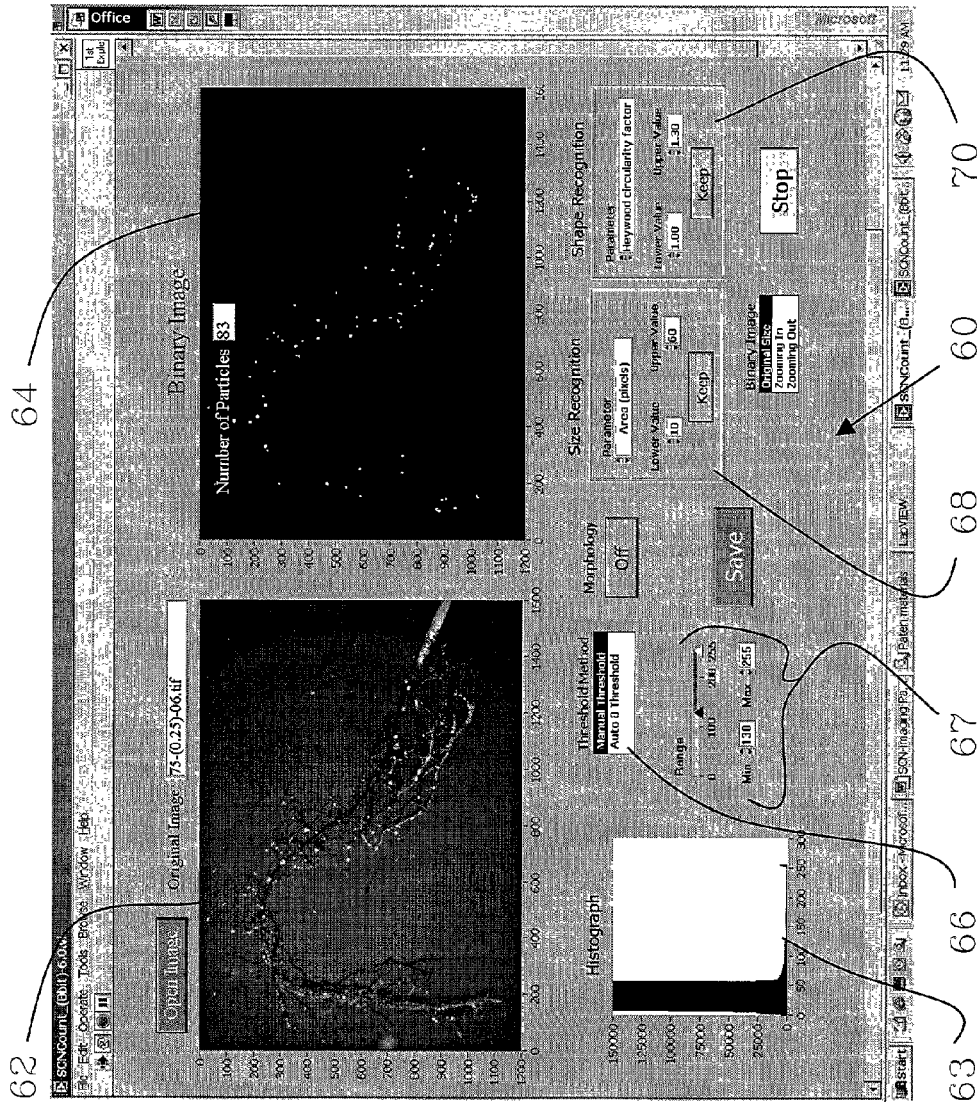
FIG. 9 is the same as FIG. 8 but shows 'Manual Thresholding' with the computing algorithm for a different soybean root.
Figure 8:
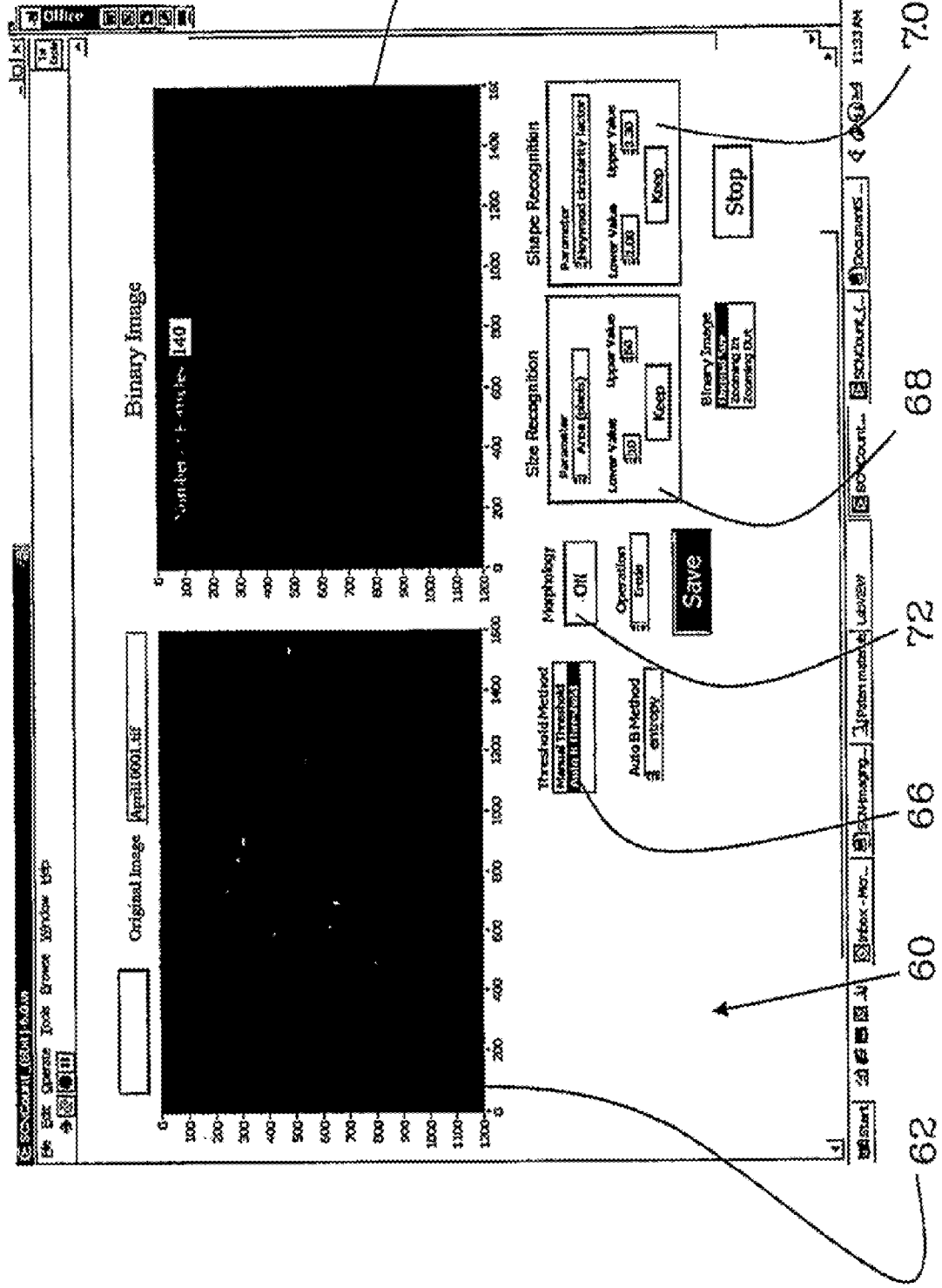
Figure 9:
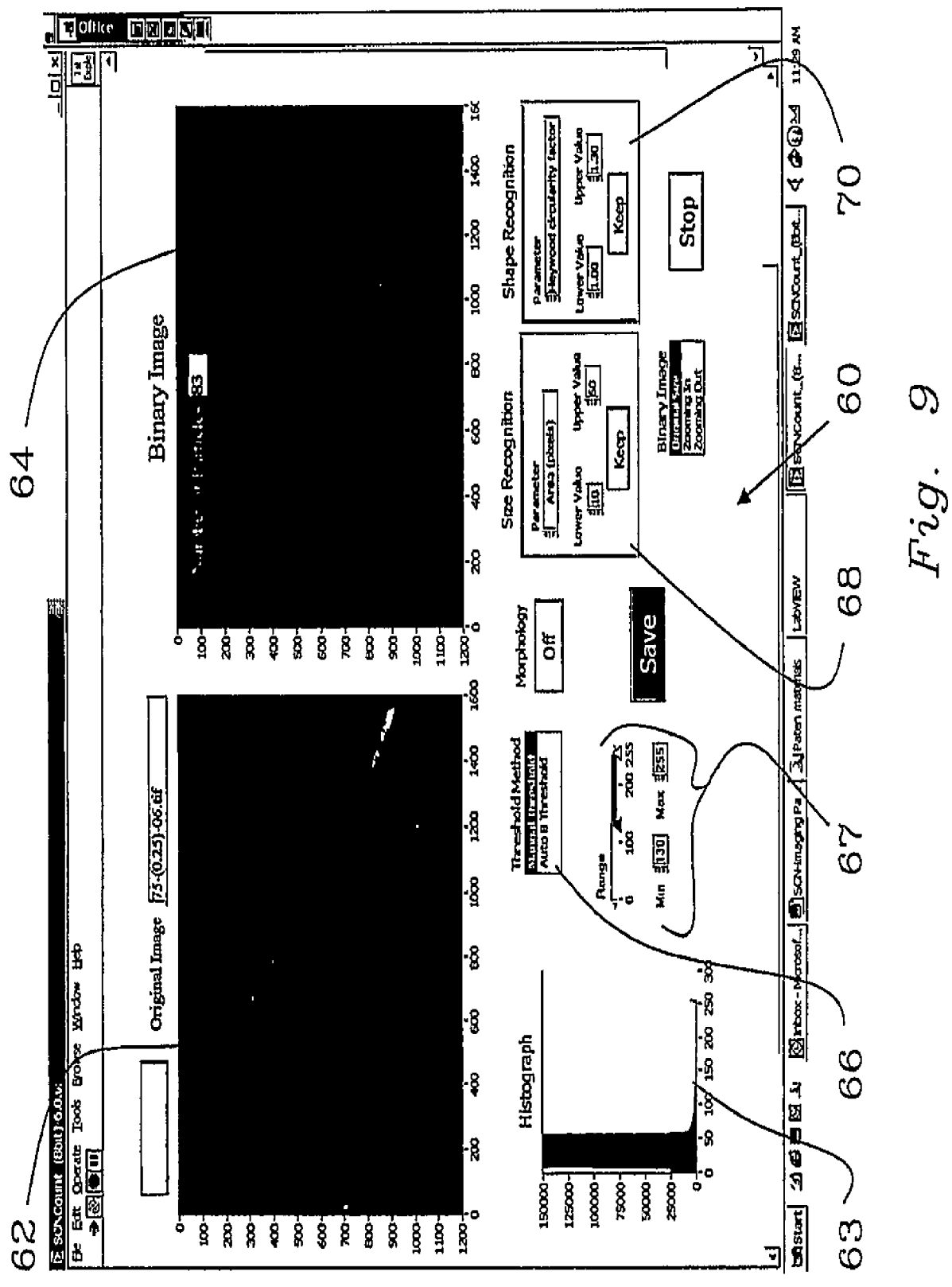

FIG. 9 illustrates a similar GUI for a different sample 14 with the option of 'Manual Threshold' selected. As can be seen from FIGS. 7 and 9, there are two threshold methods in selection box 66. With the option of 'Automatic Threshold', a threshold value is automatically computed by software algorithm and a gray-scale image 62 is then automatically processed into a binary image. With the option of "Manual Threshold", the values for thresholding a gray-scale image 62 (here Min. and Max. values as shown in numeral 67) need to be set up first either programmatically or visually from the histogram 63. And the image can then be threshold into a binary image 64. In this example, 83 cysts are identified according to the algorithm.

In FIG. 8, the "morphology" button 72 has been enabled. The software can screen out portions, or modify how it views certain bits in the image, based on programming such as suggested at step 54, FIG. 7.

In FIG. 9, the size recognition and shape recognition criteria are set the same as FIG. 8.

Once the count of the cysts is completed by the software, computer 40 can compare or fit that count into a scoring system that exists for rating resistance of that plant to SCN based on number of cysts. That information can then be utilized to determine whether the breeding program has been successful with regard to breeding soybean plants that are more resistant to SCN and/or whether this particular plant and/or its variety should be used in the experiment or in future breeding. Or, it may be used to decide whether the plant and/or its variety should be discarded or left out of any future breeding program or experiment.

Information regarding the plant and/or its parentage and/or its parental plot, and/or other information, can be stored in computer 40, or in some database accessible by computer 40, or elsewhere.

E. Options and Alternatives

The foregoing preferred embodiments are exemplary only and do not limit the invention, which is solely defined by the claims herein. It is to be understood that variations obvious to those skilled in the art are included within the spirit and scope of the invention.

For example, it is possible to use imaging of the sample without any special illumination or excitation radiation. Ambient or visible light can be used. Software can be used to evaluate the image to discriminate desired targets such as SCN. However, as has been explained, accuracy may not be acceptable.

On the other hand, it is possible to experimentally derive excitation wavelength(s) to induce fluorescence in targets in or on a plant and to collect light from the plant to manually count targets in the image, or otherwise utilize that information, without specifically using software to screen and discriminate, as previously described. In this way, the photo-induced fluorescence can be used as a way to help discriminate between parts of the image, even if the image is analyzed by the human eye, and not by automated software evaluation or imaging processing.

Furthermore, the imaging could be other than digital. For example, conventional photographic imaging, either of visible light, or of non-visible light, or both, such as is well known in the field of spectrometry and other analogous arts and methods, could be used.

There are a variety of different imaging devices that could be used, CCD being but one example.

Besides fluorescence imaging technology described above, thermal (or infrared) imaging technology was studied. Different objects such as the cysts and the roots may have different intrinsic temperatures or different emissivities. The objects with different temperatures or emissivities appeared with different brightness on a thermal image. It is believed that the cysts would react differently and have a different infrared reflection, emission, or thermal image distinguishable from the remainder of the plant and background, e.g. soybean roots and background. Infrared camera model SC3000 from Flir Systems Inc. of Boston, Mass. was used to conduct a feasibility study. It is believed that there should be at least a 0.05 degree Centigrade detectable difference between target tissue and non-target tissue for such a camera. The initial results showed that it was feasible to count the number of the cysts by using thermal imaging technology.

In the feasibility study, a heat flux (with a hand-held hair dryer) was temporarily applied to the sample of soybean root infested with SCN cysts. A thermal image was then taken. The initial results showed high contrast images with the cysts in bright spots and the background in dark. It is believed that the cysts have a higher emissivity than the background; a instantaneous temperature gradient between the cysts and the background was established when a heat flux was applied temporarily to the sample. Counting the number of the cysts could be easier with the enhanced contrast between the cysts and the background. The counting can either be manually or automatically, using software that is similar to the software in FIG. 7 for fluorescence imaging technology.

A few practical issues need to be considered when using thermal imaging: 1. The heat flux to the sample should be uniform over the sample; 2. Adjust heat flux applied to the sample accordingly with sample moisture since moisture absorbs heat; and 3. Determine the duration of the heat flux, or, synchronization of heat application with imaging taken. All objects, include the cysts and background, will reach the same temperature with extended application of heat flux. The result is an image with all objects having the same brightness, or no contrast.

Thermal imaging of the sample without applying a heat flux was also conducted. The contrast between the cysts and the background was low since intrinsic temperature differences between the cysts and the background were not sufficiently high to be adequately detected by the thermal camera.

Yet another possibility is to use stains on either the target or non-target tissue, or try to discriminate between target and background based on color differences. This could be done with or without the need of special excitation light. The key question is to identify some stains that would color the cysts and the background not only differentially but also instantly. The staining process for most known candidate stains for such a purpose is slow (tens of minutes to hours) and tedious (many steps). The best candidate, from the best of our knowledge, for such a stain is calcofluor. The stain is expected to color only root tissue. The staining process is single step plus washing, and supposed to take only tens of seconds to a couple of minutes without heating. Another candidate is fluorescein diacetate. The staining process is simple and no heating process is required. The process is expected to be about a few minutes.

What is claimed is:

1. A method for evaluating a condition or characteristic of a soybean plant that exhibits some external manifestation on the plant comprising:
    (a) collecting radiation reflected or emitted from a portion of the plant, wherein the collected radiation is from a bandwidth higher than illumination light on the plant;
    (b) imaging at least the portion of the plant;
    (c) discriminating between parts of the image based on identification of a part of the image indicative of the presence of an external manifestation.

2. The method of claim 1 wherein the plant is an agricultural plant.

3. The method of claim 2 wherein the plant is a field crop.

4. The method of claim 1 wherein the image is made by one of photography, digitization, charge coupled device, and thermal imaging.

5. The method of claim 1 further comprising the step of illuminating the portion of the plant.

6. The method of claim 5 further comprising filtering the illumination.

7. The method of claim 5 wherein the illumination comprises non-visible light.

8. The method of claim 7 wherein the non-visible light comprises infrared radiation.

9. The method of claim 7 wherein the illumination comprises ultraviolet light.

10. The method of claim 9 wherein the ultraviolet light is selected from a wavelength range that induces fluorescence from the external manifestation of the plant that is distinguishable from radiation reflected or emitted from any other pan of the plant.

11. The method of claim 7 wherein the plant is a soybean plant and the targeted condition or characteristic is soybean cyst nematode infestation on the root of the plant and the external manifestation is soybean cyst nematode cysts.

12. The method of claim 11 wherein the illumination wavelength is in the range of approximately 270–390 nm.

13. The method of claim 12 wherein the step of imaging comprises collecting radiation from the plant.

14. The method of claim 13 wherein the collected radiation is from a different range of wavelengths than the illumination wavelength.

15. The method of claim 14 wherein the different range of wavelengths is higher than the range of illumination wavelengths.

16. The method of claim 15 wherein the different range of wavelengths is approximately 530 to 780 nm.

17. The method of claim 5 wherein the step of collecting radiation includes filtering said collected radiation.

18. The method of claim 1 wherein the step of discriminating comprises visual inspection by the human eye.

19. The method of claim 1 wherein the step of discriminating comprises an evaluation of one or more of size, shape, morphology, intensity, and color.

20. The method of claim 5 wherein the step of discriminating comprises evaluation of intensity wherein evaluation of intensity comprises discrimination between intensities above and below a threshold intensity.

21. The method of claim 20 wherein the image is correlated to a binary image based on the threshold.

22. The method of claim 21 wherein the threshold is determined based on an automatic thresholding derived from an analysis of the image.

23. The method of claim 1 further comprising adding a substance to either the plant or a background of the target and discriminating based on image characteristics related to the substance.

24. The method of claim 23 wherein the substance is a stain.

25. The method of claim 1 further comprising quantifying the condition or characteristic of the plant based on the discrimination.

26. The method of claim 25 wherein the quantification comprises counting discriminated portions of the image.

27. The method of claim 26 wherein the quantification comprises evaluating one or more of intensity, size, shape, color or morphology of portions of the image.

28. The method of claim 1 further comprising utilizing the discrimination in a plant breeding program.

29. The method of claim 28 further comprising deciding to discard or keep the plant in a plant breeding experiment based on the discrimination.

30. An apparatus for evaluating a plant or portion thereof relative to a target having some external manifestation on the plant comprising:
(a) an imager adapted to collect radiation from the plant filtered by a filter, wherein the filter gasses light in the wavelength range of approximately 530–780 nm and image at least a portion of a plant;
(b) a processor operatively in communication with the imager;
(c) software operatively loaded on the processor for discriminating target from non-target in the image by identifying one or more parts of the image indicative of the presence of an external manifestation.

31. The apparatus of claim 30 wherein the imager is a digital linager.

32. The apparatus of claim 30 wherein the imager further comprises a lens.

33. The apparatus of claim 30 further comprising a bandpass filter between the plant and the imager.

34. The apparatus of claim 30 wherein the imager is a CCD camera.

35. The apparatus of claim 30 further comprising an illumination source adapted to provide illumination within the field of view of the imager.

36. The apparatus of claim 35 wherein the illumination source is filtered to a selected wavelength range.

37. The apparatus of claim 35 wberein the illumination source is filtered to a wavelength pre-selected to cause fluorescence of the external manifestation which is detectably different than radiation reflected or emitted from other parts of the plant.

38. The apparatus of claim 35 wherein the target is SCN and the illumination source is filtered to within the wavelength range of approximately 270–390 nm.

39. The apparatus of claim 35 wherein the illumination source is filtered to infrared radiation.

40. The apparatus of claim 30 wherein the filter is selected to pass radiation which is highly discrirninatable of fluorescence from the target.

41. The apparatus of claim 30 wherein the software is digital image evaluation software.

42. The apparatus of claim 41 wherein the software discriminates based on grey-scale of pixels of the image.

43. The apparatus of claim 41 wherein the software discriminates based on intensity of pixels of the image.

44. The apparatus of claim 41 wherein the software modifies the image based on morphology rules.

45. The apparatus of claim 41 wherein the software discriminates based on at least one of intensity, shape, size, color or morphology related to portions of the digital image.

46. A method of discriminating SCN cysts from the remainder of a soybean plant comprising:
(a) illuminating roots of a soybean plant with light in the wavelength range of approximately 290–370 nm;
(b) collecting photo-induced fluorescence from the soybean roots.

47. The method of claim 46 further comprising discriminating by intensity parts of an image formed by radiation reflected or emitted by the plant.

48. The method of claim 47 further comprising discriminating portions of the image by size, shape and/or morphology.

49. The method of claim 48 further comprising counting portions of the image exceeding an intensity threshold and meeting pattern criteria.

50. The method of claim 46 further comprising utilizing the discrimination method in a plant breeding experiment to identify soybean plants which are indicated for further use in the experiment.

51. A method for counting soybean cyst nematode cysts in a soybean plant comprising:
(a) determining a range of wavelengths of illumination light which will cause substantial fluorescing of soybean cyst nematode cysts of an intensity detectable relative to other parts of the soybean plant;
(b) illuminating a root of a soybean plant with the determined range of illumination light;
(c) comparing intensity of radiation collected from different parts of the illuminated root to discriminate soybean cyst nematode cysts.

52. The method of claim 51 wherein the range of illumination wavelengths is in the ultraviolet spectrum.

53. The method of claim 51 wherein the collected radiation is in a wavelength range different from the said range of illumination wavelengths.

54. The method of claim 51 wherein the discrimination is by digital imaging.

55. The method of claim 51 wherein the discrimination uses an intensity threshold.

56. The apparatus of claim 51 wherein the discrimination is used to count cysts.

57. The apparatus of claim 56 further comprising using the count in a plant breeding experiment to indicate whether the soybean plant is a candidate from further use in the experiment.

58. A method according to claim 1 of evaluating and quantifying presence of a condition or characteristic of a plant, where the condition or characteristic includes some external manifestation on the plant comprising:
(a) illuminating at least a portion of the plant with radiation selected to induce reflection or emission from the external manifestation of like in kind but different intensity than radiation from other parts of the plant or a background of at least a part of the plant;
(b) imaging the illuminated portion of the plant and background by collecting radiation emitted and/or reflected from the illuminated portion of the plant and background;
(c) identifying external manifestations in the image based on evaluation of the image.

59. The method of claim 58 wherein the portion of the plant is the at least a portion of the root of the plant and the step of imaging comprises imaging the illuminated root or its portion and background of the root or its portion by collecting radiation emitted and/or reflected from the illuminated root and the background; assigning criteria indicative of the presence of a cyst, the criteria comprising one or more of intensity, size, shape, color, morphology; scanning said image for parts meeting said criteria counting each part of the image meeting said criteria.

60. The method of claim 58 wherein the condition or characteristic of the plant is SCN infestation in a root of a soybean plant and further comprising:
(a) illuminating the root with radiation selected to induce reflection or emission of like in kind but different intensity from SCN cysts than from other parts of the soybean plant or the background;
(b) imaging the illuminated root and background by collecting radiation emitted and/or reflected from the illuminated root and background;
(c) identifying cysts in the image based on evaluation of the image.

61. The method of claim 60 further comprising:
(a) illuminating the root with UV radiation selected to induce fluorescence of greater intensity from SCN cysts than from other parts of the soybean plant or the background;
(b) imaging the illuminated root and background by collecting radiation emitted and/or reflected from the illuminated root and background;
(c) assigning criteria indicative of the presence of a cyst, the criteria comprising one or more of intensity, size, shape, color, morphology,
(d) scanning said image for parts meeting said criteria;
(e) counting each part of the image meeting said criteria.

62. The method of claim 60 further comprising:
(a) placing a soybean plant root on or adjacent a non-reflective, non-fluorescing background;
(b) illuminating the root with XUV radiation selected to induce fluorescence of greater intensity from SCN cysts than from other parts of the soybean plant or the background;
(c) digitally imaging into a plurality of pixels the illuminated root and background by collecting radiation emitted and/or reflected from the illuminated root and background;
(d) assigning pixel criteria indicative of the presence of a cyst, the pixel criteria comprising an intensity threshold level for each pixel and pattern criteria for a set of pixels each exceeding the intensity threshold level;
(e) scanning said digital image for sets of pixels meeting said pixel criteria;
(f) counting each set of pixels meeting said pixel criteria.

63. The method of claim 62 further comprising discriminating between parts of the image based on said assignments whether collected intensity at a pixel is higher or lower than said threshold level; assigning presence of a cyst in higher intensity level parts of the image if a set of pixels meets size, shape, color and/or morphology criteria indicative of a cyst; quantifying cysts based on number of said assigned presences of cysts.

64. A method for evaluating soybean cyst nematode infestation on a soybean plant comprising:
(a) illuminating a portion of the soybean plant with non-visible light;
(b) imaging at least the portion of the plant;
(c) discriminating between parts of the image based on identification of a part of the image indicative of the presence of one or more cysts.

65. The method of claim 64 wherein the illumination wavelength is in the range of approximately 210–390 nm.

66. The method of claim 65 wherein the step of imaging comprises collecting radiation from the plant.

67. The method of claim 66 wherein the collected radiation is from a different range of wavelengths than the illumination wavelength.

68. The method of claim 67 wherein the different range of wavelengths is higher than the range of illumination wavelengths.

69. The method of claim 68 wherein the different range of wavelengths is approximately 530 to 760 nm.

70. A method for evaluating a condition or characteristic of a plant that exhibits some external manifestation on the plant comprising:
(a) imaging at least a portion of a plant;
(b) discriminating between parts of the image based on identification of a part of the image indicative of the presence of an external manifestation;
(c) wherein the step of discriminating comprises an evaluation of one or more of size, shape, morphology, intensity, and color; wherein evaluation of intensity comprises discrimination between intensities above and below a threshold intensity; and wherein the image is correlated to a binary image based on the threshold.

71. The method of claim 70 wherein the threshold is determined based on an automatic thresholding derived from an analysis of the image.

72. A method for evaluating a condition or characteristic of a plant that exhibits some external manifestation on the plant comprising:
(a) wherein the condition or characteristic of the plant is SCN infestation in a root of a soybean plant further comprising illuminating the root with radiation selected to induce reflection or emission of like in kind but different intensity from SCN cysts then from other parts of the soybean plant or the background;
(b) imaging the illuminated root and background by collecting radiation emitted and/or reflected from the illuminated root and background;
(c) discriminating between parts of the image based on identification of a part of the image indicative of the presence of an external manifestation, wherein the discriminating comprises identifying cysts in the image based on evaluation of the image.

73. The method of claim 72 further comprising:
(a) illuminating the root with UV radiation selected to induce fluorescence of greater intensity from SCN cysts than from other parts of the soybean plant or the background;
(b) imaging the illuminated root and background by collecting radiation emitted and/or reflected from the illuminated root and background;
(c) assigning criteria indicative of the presence of a cyst, the criteria comprising one or more of intensity, size, shape, color, morphology;

(d) scanning said image for parts meeting said criteria;
(e) counting each part of the image meeting said criteria.

74. The method of claim 72 further comprising:
(e) placing a soybean plant root on or adjacent to a non-reflective, non-fluorescing background;
(b) illuminating the root with UV radiation selected to induce fluorescence of greater intensity form SCN cysts than from other parts of the soybean plant or the background;
(c) digitally imaging into a plurality of pixels the illuminated root and background by collecting radiation emitted and or reflected from the illuminated root and background;
(d) assigning pixel criteria indicative of the presence of a cyst, the pixel criteria comprising an intensity threshold level for each pixel and pattern criteria for a set of pixels each exceeding the intensity threshold level;
(e) scanning said digital image for sets of pixels meeting said pixel criteria;
(f) counting each set of pixels meeting said pixel criteria.

75. The method of claim 73 further comprising discriminating between parts of the image based on said assignments whether collected intensity at a pixel is higher or lower than said threshold level; assigning presence of a cyst in higher intensity level parts of the image if a set of pixels meets size, shape, color and/or morphology criteria indicative of a cyst; quantifying cysts based on number of said assigned presences of cysts.

76. An apparatus for evaluating a plant or portion therof relative to a target having some external manifestation of the plant, wherein said target is SCN, comprising:
(a) an imager adapted to collect radiation filtered by a filter from the plant, wherein the filter passes light in the wavelength range of approximately 530–780 nm and image at least a portion of a plant;
(b) a processor operatively in communication with the imager;
(c) software operatively loaded on the processor for discriminating target from non-target in the image by identifying one or more parts of the image indicative of the presence of one or more SCN cysts; and
(d) an illumination source adapted to provide illumination within the field of view of the imager, wherein said illumination source is filtered to within the wavelength range of approximately 270–390 nm.

77. The method of claim 64 wherein the condition of characteristic in one or more of *Heterodera glycines* (soybean cyst nematode) on common bean, vetch, lespedeza, lupine and 'weedy' legumes; *Heterodera trifolii* on clover; *Heterodera avenae* on cereals including oats; *Heterodera schachtii* on sugar beets, crucifers and spinach; and *Globodera rostochiensis* on tomato and eggplant.

78. The method of claim 64 wherein the plant is a corn plant, and the condition or characteristic is corn ear mold on corn.

* * * * *

UNITED STATES PATENT AND TRADEMARK OFFICE
CERTIFICATE OF CORRECTION

PATENT NO. : 7,123,750 B2
APPLICATION NO. : 10/060817
DATED : October 17, 2006
INVENTOR(S) : Hugh Lu and Edwin J. Anderson It is certified that error appears in the above-identified patent and that said Letters Patent is hereby corrected as shown below:

Sheet 8 of 9 (Fig. 8) should be replaced with the Replacement Drawing - Fig. 8 as shown on the attached page.

Sheet 9 of 9 (Fig. 9) should be replaced with the Replacement Drawing - Fig. 9 as shown on the attached page.

Column 12, Line 46, should read

-- part of the plant. --

Column 13, Line 14, should read

-- substance to either the plant or a background of the plant --

Column 13, Line 36, should read

-- filtered by a filter, wherein the filter passes light in the --

Column 13, Line 46, should read

-- digital imager --

Column 15, Line 47, should read

-- (b) illuminating the root with UV radiation selected to --

Column 16, Line 13, should read

-- wavelength is in the range of approximately 270 - 390 nm. --

Column 16, Line 23, should read

-- wavelengths is approximately 530 to 780 nm. --

Column 17, Line 4, should read

-- (a) placing a soybean plant root on or adjacent to a --

UNITED STATES PATENT AND TRADEMARK OFFICE
CERTIFICATE OF CORRECTION

PATENT NO.        : 7,123,750 B2
APPLICATION NO. : 10/060817
DATED             : October 17, 2006
INVENTOR(S)       : Hugh Lu and Edwin J. Anderson It is certified that error appears in the above-identified patent and that said Letters Patent is hereby corrected as shown below:

Column 17, Line 7, should read

-- induce fluorescence of greater intensity from SCN cysts --

Column 18, Line 2, should read

-- relative to a target having some external manifestation on the --

Signed and Sealed this

Eighteenth Day of December, 2007

JON W. DUDAS
*Director of the United States Patent and Trademark Office*